(12) United States Patent
Kumar et al.

(10) Patent No.: US 6,542,515 B1
(45) Date of Patent: Apr. 1, 2003

(54) PROFILE SERVICE

(75) Inventors: Ravi Kumar, Louisville, CO (US); Paul William Weschler, Jr., Broomfield, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/314,789

(22) Filed: May 19, 1999

(51) Int. Cl.[7] ............................................. H04L 12/66
(52) U.S. Cl. ..................... 370/463; 709/220; 709/203; 707/6; 707/10; 707/102; 707/103 R
(58) Field of Search ................... 370/401, 466, 370/467, 352, 463; 709/201–203, 220–222, 223, 225; 707/3–6, 8–10, 102, 103 R–103 Z

(56) References Cited

U.S. PATENT DOCUMENTS

| | | | |
|---|---|---|---|
| 5,832,506 A | | 11/1998 | Kuzman |
| 6,032,203 A | * | 2/2000 | Heidhues ...................... 710/11 |
| 6,070,188 A | * | 5/2000 | Grant et al. ................. 709/223 |
| 6,205,472 B1 | * | 3/2001 | Gilmour ...................... 709/206 |
| 6,253,202 B1 | * | 6/2001 | Gilmour ........................... 707/9 |
| 6,256,641 B1 | * | 7/2001 | Kasi et al. ................... 707/202 |
| 6,343,287 B1 | * | 1/2002 | Kumar et al. ................... 707/4 |
| 6,404,743 B1 | * | 6/2002 | Meandzija et al. .......... 370/254 |
| 6,405,197 B2 | * | 6/2002 | Gilmour ........................... 707/5 |

OTHER PUBLICATIONS

U. S Patent Application Publication No. US 2002/0007374 A1 to Marks et al.*
A. Paepcke, S. B. Cousins, H. Garcia–Molina, S. W. Hassan, S. P. Ketchpel, M. Roscheisen, and T. Winogard, "Using Distributed Objects for Digital Library Interoperability", IEEE May, 1996, pp. 61–68.*
L. Kellong, and E. Zeisler, "Interface Management: A CORBA Universal Service Manager", IEEE 1998, pp. 148–149.*
R. R. Voruganti, "A Global Network Management Framework for the 90s", IEEE 1994, pp. 1094–1098.*
RFC 2251 Lightweight Directory Access Protocol (v3), by M. Wahl et al., Dec. 1997 (Internet Engineering Task Force).
RFC 2589 "Lightweight Directory Access Protocol (v3) Extensions for Dynamic Directory Services" By Y. Yaacovi et al., May 1999 (Internet Engineering Task Force).

* cited by examiner

Primary Examiner—Hassan Kizou
Assistant Examiner—Thai D Hoang
(74) Attorney, Agent, or Firm—Stuart T. Langley; William J. Kubida; Hogan & Hartson LLP

(57) ABSTRACT

A mechanism for managing a plurality of profile data structures including a plurality of profile objects having an interface for sending and receiving information and a profile service mechanism having an interface for sending and receiving information. A protocol layer operatively coupled to the profile objects interface and the profile service interface, the protocol layer defining a plurality of request elements and a plurality of response elements. A protocol layer interface within the protocol layer receives user-entity specified set of request elements from the user entity and sends a responsive set of response elements to the user entity. A first set of methods within the profile service mechanism that create instances of the profile objects, where each of the first set of methods correspond to one of the request elements and one of the response elements. A second set of methods within the profile objects that manipulate instances of the profile objects, where each of the second set of methods correspond to one of the request elements and one of the response elements.

28 Claims, 6 Drawing Sheets

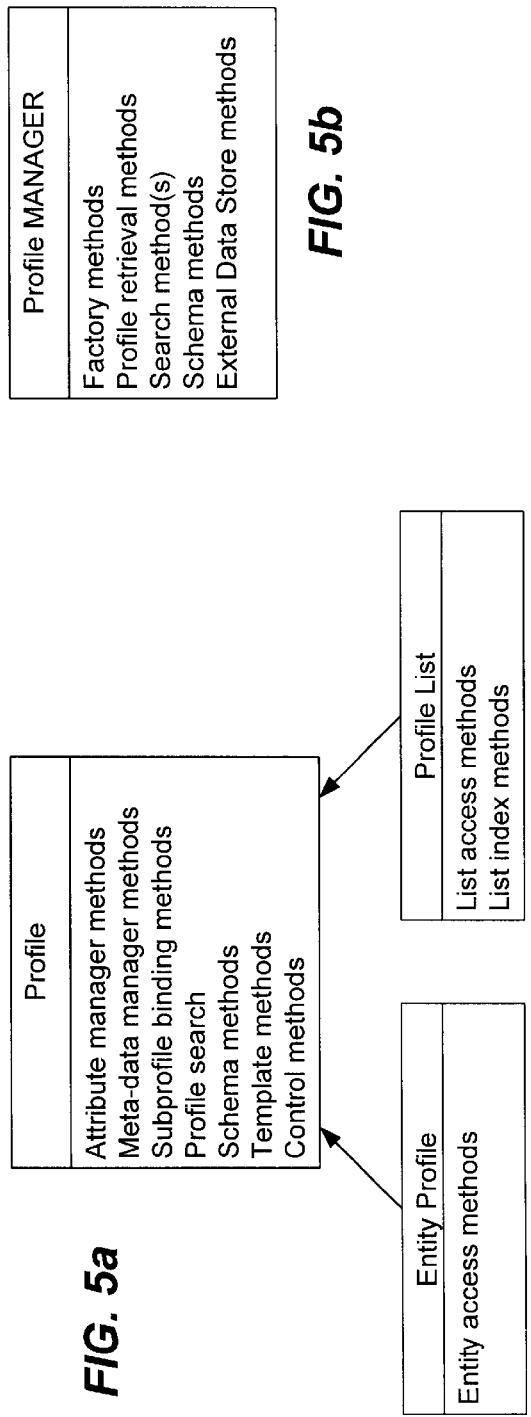
FIG. 5a
FIG. 5b
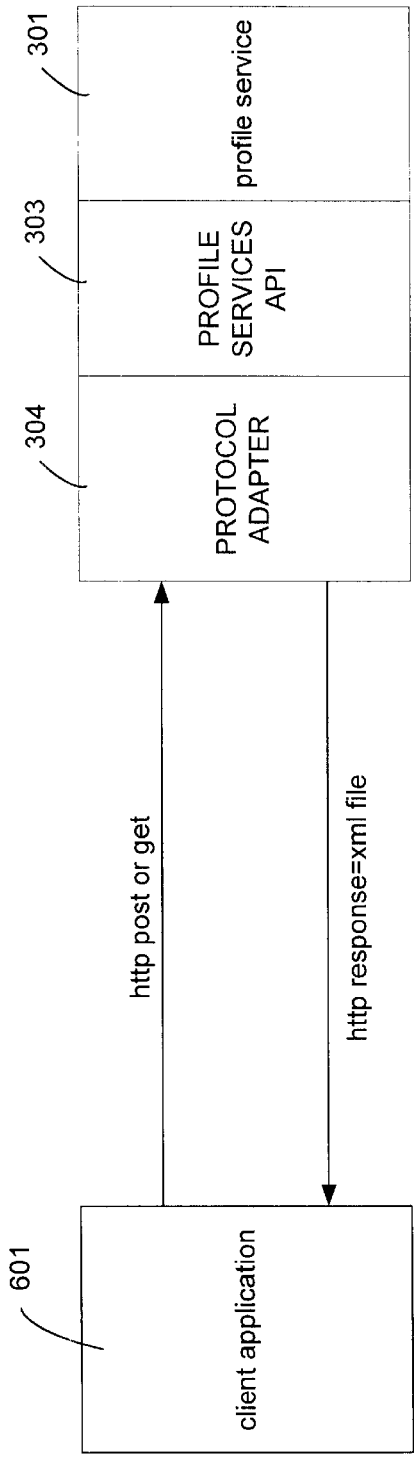
FIG. 6

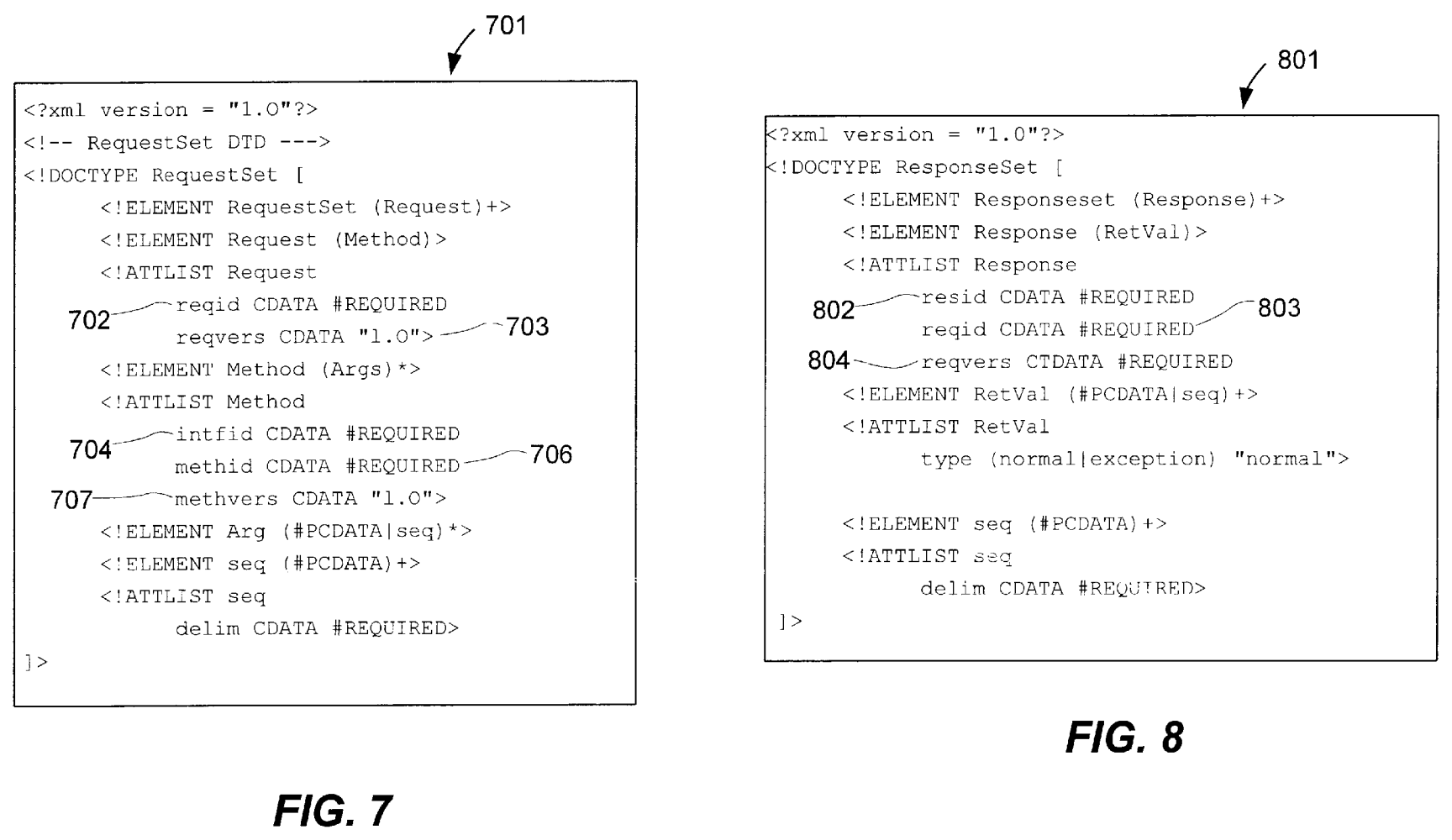

```
<?xml version = "1.0"?>
<!-- RequestSet DTD --->
<!DOCTYPE RequestSet [
    <!ELEMENT RequestSet (Request)+>
    <!ELEMENT Request (Method)>
    <!ATTLIST Request
702 ──────  reqid CDATA #REQUIRED
            reqvers CDATA "1.0"> ────── 703
    <!ELEMENT Method (Args)*>
    <!ATTLIST Method
704 ──────  intfid CDATA #REQUIRED
            methid CDATA #REQUIRED ────── 706
707 ──────  methvers CDATA "1.0">
    <!ELEMENT Arg (#PCDATA|seq)*>
    <!ELEMENT seq (#PCDATA)+>
    <!ATTLIST seq
            delim CDATA #REQUIRED>
]>
```

*FIG. 7*

```
<?xml version = "1.0"?>
<!DOCTYPE ResponseSet [
    <!ELEMENT Responseset (Response)+>
    <!ELEMENT Response (RetVal)>
    <!ATTLIST Response
802 ──────  resid CDATA #REQUIRED
            reqid CDATA #REQUIRED ────── 803
804 ──────  reqvers CTDATA #REQUIRED
    <!ELEMENT RetVal (#PCDATA|seq)+>
    <!ATTLIST RetVal
            type (normal|exception) "normal">
    <!ELEMENT seq (#PCDATA)+>
    <!ATTLIST seq
            delim CDATA #REQUIRED>
]>
```

*FIG. 8*

PROFILE SERVICE

BACKGROUND OF THE INVENTION

1. Field of the Invention

The present invention relates, in general, to enterprise computing systems and methods, and, more particularly, to a method and system that provides a high performance interface to integrate, store, retrieve and manage reference information about entities.

2. Relevant Background

Computer systems including business systems, entertainment systems, and personal communication systems are increasingly implemented as distributed software systems. These systems are alternatively referred to as "enterprise networks" and "enterprise computing systems". These systems include application code and data that are distributed among a variety of data structures, data processor systems, storage devices and physical locations. They are intended to serve a geographically diverse and mobile set of users. This environment is complicated because system users move about the distributed system, using different software applications to access and process data, different hardware to perform their work, and often different physical locations to work from. These trends create a difficult problem in providing a secure yet consistent environment for the users.

In general, distributed computing systems must scale well. This means that the system architecture desirably adapts to more users, more applications, more data, and more geographical distribution of the users, applications, and data. The cost in money and time to switch over a network architecture that is adapted to a smaller business to one suited for a larger business is often prohibitive.

A conventional computing system uses a client/server model implemented on a local area network (LAN). In such systems powerful server computers (e.g., application servers and file servers) are used to process and access data. The requested data is then transmitted to the client computer for further processing. To scale to larger networks, multiple LANs may be internetworked using, for example, leased data lines to create a wide area network (WAN). The equipment required to implement a WAN is expensive and difficult to administer. Also, as networks become larger to include multiple LANs and multiple servers on each LAN it becomes increasingly difficult to find resources (i.e., files, applications, and users) on any one of the LANs.

As computing power continues to become less expensive, clients tend to process and store their own data, using the server primarily as file servers for sharing data with other client computers. Each software application running on the client, or the client's operating system (OS) may save client-specific configuration data that is used by the client to fine-tune and define the user's software environment at runtime.

As used herein, the term "profile information" refers to any information or meta-data used by a particular piece of hardware, software, or operating system to configure, initialize, shutdown and aide in making runtime processing decisions. The profile information may be associated with a particular application or group of applications, a particular hardware device or group of devices, as well as a particular user or group of users. Some operating systems store user profile information that is used during boot operations application startup to tailor a limited number of the system characteristics to a particular machine user. However, this profile information is closely tied to a single machine and operating system. As a result, the profile information is not useful to a new user the first time that user logs onto a particular machine. Moreover, this information is not available to remote users that are accessing the LAN/WAN using remote access mechanisms.

Existing mechanisms tend to focus on a single type of profile information, user information or application information or hardware information. Also, because these mechanisms are very application specific they limit the number and type of attributes that can be retained. Further, the profile information is isolated and fails to indicate any hierarchical or relational order to the attributes. For example, it may be desirable that a user group is required to store all files created using a particular application suite to a specific file server. Existing systems, if such a service is available at all, must duplicate profile information in each application program merely to implement the required file storage location preference. Storage location direction based on a user-by-user or user group basis is difficult to implement and may in fact require a shell application running on top of the application suite. Even then, the system is not extensible to access, retrieve, and use profile information for a new user that has not used a particular machine before.

As in the example above, existing systems for storing configuration information lead to duplicative information stored in many locations. Each application stores a copy of its own configuration information, as does each hardware device and each user. Much of this information is identical. It is difficult to maintain consistency among these many copies in a distributed computing environment. For example, when the specified file storage location changes, each copy of the configuration information must be changed. The user or system administrator must manually track the location and content of each configuration file. An example of the inefficiencies of these types of systems is found in the Windows 95 registry file that holds profile information but has an acknowledged tendency to bloat over time with duplicative and unused data. Moreover, the registry file in such systems is so closely tied to a particular machine and instance of an operating system that it cannot be remotely accessed and used to configure other computers or devices. Hence, these systems are not generally extensible to manage multiple types of profile information using a single mechanism. A need exists for profile information that is readily accessible to all machines coupled to a network and to machines accessing the network through remote access mechanisms.

Another complicating influence is that networks are becoming increasingly heterogeneous on many fronts. Network users, software, hardware, and geographic boundaries are continuously changing and becoming more varied. For example, a single computer may have multiple users, each of which work more efficiently if the computer is configured to meet their needs. Conversely, a single user may access a network using multiple devices such as a workstation, a mobile computer, a handheld computer, or a data appliance such as a cellular phone or the like. A user may, for example, use a full featured email application to access email while working from a workstation but prefer a more compact application to access the same data when using a handheld computer or cellular phone. In each case, the network desirably adapts to the changed conditions with minimal user intervention.

There is increasing interest in remote access systems that enable a user to access a LAN/WAN using a public, generally insecure, communication channels such as the Internet.

Further, there is interest in enabling LANs to be internet-worked using public communication channels. This is desirable because the network administrator can provide a single high speed gateway to the Internet rather than a remote server/modem combination for each user and expensive WAN communication lines. The Internet gateway can use leased lines to access the Internet rather than more costly business phone lines. Also, the Internet gateway can be shared among a variety of applications and so the cost is not dedicated solely to providing remote access or wide area networking. The reduction in hardware cost and recurrent phone line charges would be significant if remote users could access the LAN/WAN in this manner.

From a network user's perspective these limitations boil down to a need to manually configure a given computer to provide the user's desire computing environment. From a remote user's perspective these limitations require the user to manually reconfigure the remote access computer to mimic the desired computing environment or tolerate the generic environment provided by default by the remote access server. From a network administrator's perspective, these complications require software and operating systems to be custom configured upon installation to provide the desired computing environment. In each case, the time and effort consumed simply to get "up and running" is a significant impediment to efficient use of the distributed computing environment. What is needed is a system that readily adapts to a changing, heterogeneous needs of a distributed network computing environment.

One solution to the problem of finding resources in a distributed system is to use directories. Directories are data structures that hold information such as mail address book information, printer locations, public key infrastructure (PKI) information, and the like. Because of the range of functions and different needs of driving applications, most organizations end up with many different, disparate directories. These directories do not interact with each other and so contain duplicative information and are difficult to consistently maintain.

Meta-directories are a solution that provides directory integration to unify and centrally manage disparate directories within an enterprise. A metadirectory product is intended to provide seamless integration of the multiple disparate directories. However, existing solutions fall short of this seamless integration because the problems to be solved in directory integration are complex. Metadirectory solutions are not sufficiently extensible to account for the wide variety of resources available on a network. In the past, metadirectory technology has not been used to catalog meta-data of sufficiently general nature to meet the needs of a dynamically growing and changing distributed computing environment.

Directory and meta-directory solutions, however, tend to require specialized interfaces to access resources. This limits the devices and software applications that can use the directory and meta-directory resources, limits scalability, and makes it more difficult to integrate a new types of devices and software into the system. Some efforts have been made to create standardized directory access protocols such as X.500, lightweight directory access protocol, and the like. However, a need remains for a system for accessing profile information that is readily scaleable and adaptable to new software and hardware.

SUMMARY OF THE INVENTION

Briefly stated, the present invention involves a mechanism for managing a plurality of profile data structures including a plurality of profile objects having an interface for sending and receiving information and a profile service mechanism having an interface for sending and receiving information. A protocol layer operatively coupled to the profile objects interface and the profile service interface, the protocol layer defining a plurality of request elements and a plurality of response elements. A protocol layer interface within the protocol layer receives user-entity specified set of request elements from the user entity and sends a responsive set of response elements to the user entity. A first set of methods within the profile service mechanism provide "factory" and configuration functions to create and retrieve instances of the profile objects. Each of the first set of methods correspond to one of the request elements and one of the response elements. A second set of methods within the profile objects that manipulate instances of the profile objects, where each of the second set of methods correspond to one of the request elements and one of the response elements.

BRIEF DESCRIPTION OF THE DRAWINGS

FIG. 5 illustrates meta-data fields of a portion of a profile in accordance with the present invention; and FIG. 6A and FIG. 6B show class structure and relationships between classes used in an exemplary embodiment of the present invention.

DETAILED DESCRIPTION OF THE PREFERRED EMBODIMENTS

Figure 1:
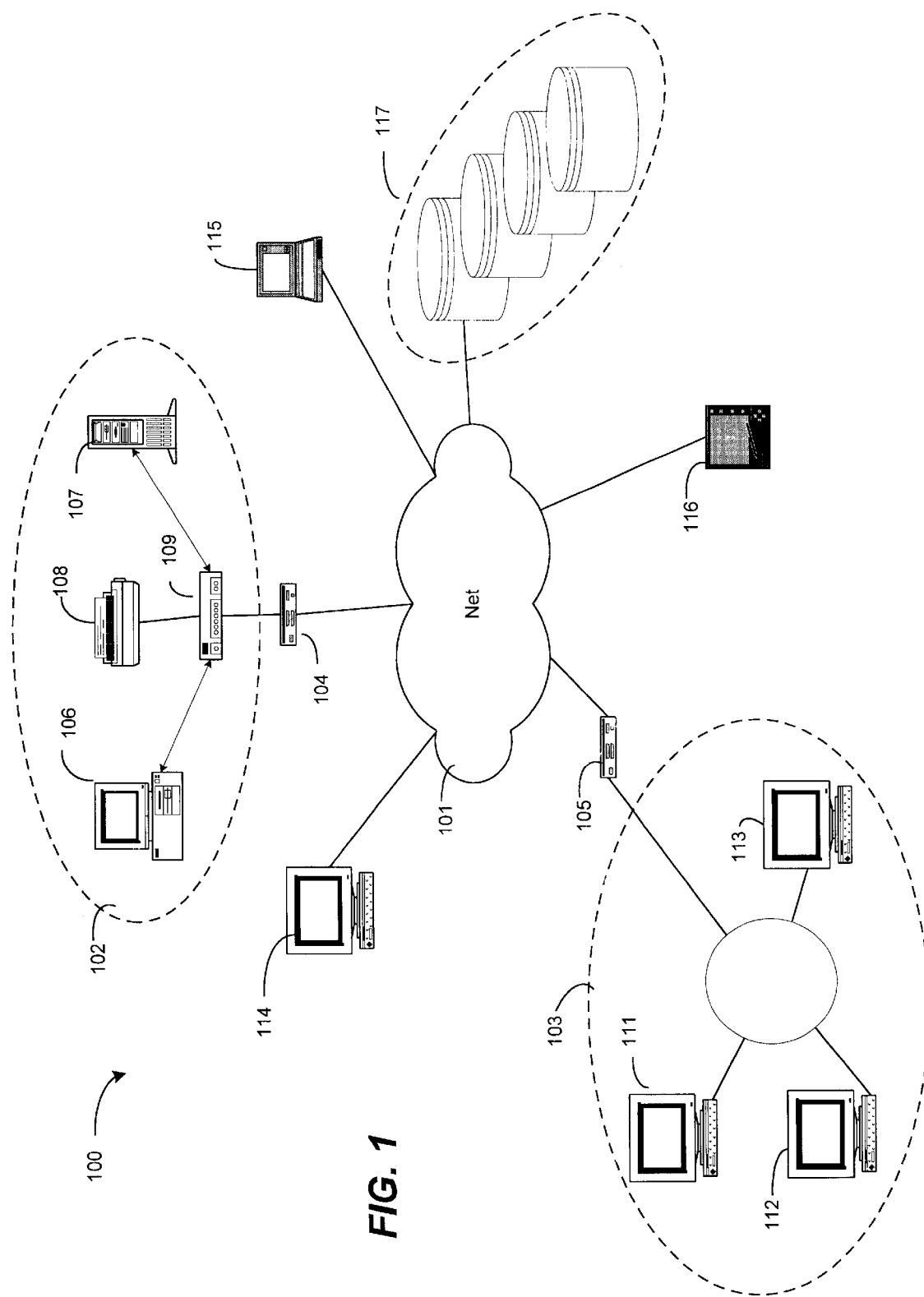
FIG. 1 illustrates an exemplary network computing environment in which the present invention is implemented.

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary the present invention is applicable to significantly larger, more complex network environments as well as small network environments such as conventional LAN systems.

It is contemplated that the present invention will be particularly useful in environments that require a data structure that is quickly searched and where the data is suited to a hierarchical representation. Also, the system of the preferred implementation is optimized to store and make available relatively compact units of data that serve to configure devices and computer environments rather than operational or analytical data upon which the computer environment may operate at runtime. Hence, the present invention is best used when it stores and retrieves data that is frequently searched and retrieved, but infrequently changed.

To aid understanding several words and terms used herein to describe the present invention are defined below:

Attribute The combination of a key related to one or more values. Frequently described as a key=value pair.

Binding A special type of attribute where the value of the key=value pair is itself a Profile. Binding one Profile to another in a chained fashion it is possible build tree structures of related profiles and attribute information (called a profile tree).

Profile A collection of attributes related either directly or indirectly to a EntityProfile that represents some sort of entity such as a user.

EntityProfile A collection of attributes that establish the root of a profile tree and serve as the base representation of some entity. This is the core data object around which the entire Profile Service is designed to function. In an object oriented sense an EntityProfile extends a Profile to add special functions and behavior.

ProfileList A special type of Profile whose member attributes (with the exception of some system attributes) are themselves Profiles. In an object oriented sense a ProfileList extends a Profile to add special functions and behavior.

Profile Service The term generally used to refer to all of the functional interfaces of Profile Service. The term is frequently used to refer specifically to the core Profile Service interface.

Profile Service Interface The core functional interface of the Profile Service. This interface provides functions for creating, searching and removing profiles in addition to some administrative utilities.

Profile Interfaces A term used to collectively refer to the functional interfaces of Profile, EntityProfiles and ProfileLists. These interfaces provide functions for manipulating the composition of individual Profiles.

Profile Protocol—A data transport methodology that exposes functional interfaces in a language and platform independent manner. It is a distributed communication mechanism implemented in the examples herein as extensible markup language (XML) over hypertext transfer protocol (HTTP).

Resource ID An identifier that is constructed by the Profile Service to uniquely identify every constituent profile and attribute therein. Resource IDs have a well defined string structure.

Profile Type A special attribute of all Profiles. This attribute is mandatory for all profiles and plays an important role in generating resource IDs and data indexing.

Entity-Entity ID A special attribute of all EntityProfiles. This attribute plays an important role in generating resource IDs and data indexing. The Profile Service enforces the rule that all entity IDs are unique within the set of all EntityProfiles of the same type.

List Key A special attribute of all ProfileLists. This attribute plays an important role in generating resource IDs and data indexing. The Profile Service enforces the rule that all profiles bound to a ProfileList are bound to the key such that that the profileList.attKey= memberProfile.listKey.value. ProfileLists may only have one member Profile with a specific list key value.

List Members A term used to refer to the collection of Profiles bound to a ProfileList. Each bound profile is referred to as a member.

FIG. 1 shows an exemplary computing environment 100 in which the present invention may be implemented. Essentially, a number of computing devices and groups of devices are interconnected through a network 101. For example, a LAN 102 and a LAN 103 are each coupled to network 101 through gateway machines 104 and 105 respectively. LANs 102 and 103 may be implemented using any available topology such as a hub and spoke topology of LAN 102 and a loop topology of LAN 103. LANs 102 and 103 may implement one or more server technologies including, for example a UNIX, Novell, or Windows NT, or peer-to-peer type network. Each network will include distributed storage implemented in each device and typically includes some mass storage device coupled to or managed by a server computer. Network 101 comprises, for example, a public network such as the internet or another network mechanism such as a fibre channel fabric or conventional WAN technologies.

LAN 102 includes one or more workstations such as personal computer (PC) 106. LAN 102 also includes a server machine 107 and one or more shared devices such as printer 108. A hub or router 109 provides a physical connection between the various devices in LAN 102. Router 104 is coupled through gateway 109 to provide shared access to network 101. Gateway 109 may implement any desired access and security protocols to manage access between network 101 and devices coupled to network 102. Similarly, network 103 comprises a collection of workstations 111, 112 and 113 that share a common connection to network 101 through gateway 105.

Distributed computing environment 100 further includes a wide variety of devices that have a logical connection to the network supported by a physical connection to network 101. For example, a stand alone workstation 114 may couple to network 101 through a modem or other suitable physical connection. Likewise, notebook computer 115 and palmtop computer 116 may connect to network 101 using known connection technologies. It is contemplated that a wide variety of devices may join the distributed network 100 including mobile phones, remote telemetry devices, information appliances, and the like. An important feature of the present invention is that it tolerates and adapts to an environment filled with heterogeneous hardware devices coupled to the network 101 from a variety of physical locations.

Each of the devices shown in FIG. 1 may include memory, mass storage, and a degree of data processing capability sufficient to manage their connection to network 101. The computer program devices in accordance with the present invention are implemented, for example in the memory of the various devices shown in FIG. 1 and enabled by the data processing capability of the devices shown in FIG. 1. Alternatively, the computer program devices in accordance with the present invention may be implemented in mass storage such as a magnetic or optical disk, of in a signal propagating between or within components shown in FIG. 1. In addition to local memory and storage associated with each device, it is often desirable to provide one or more locations of shared storage such as disk farm 116 that provides mass storage capacity beyond what an individual device can efficiently use and manage. Selected components of the present invention may be stored in or implemented in shared mass storage such as disk farm 116.

The computer program product devices in accordance with the present invention include elements that operate in a server such as server 106, a client such as workstation 111, or both. It is contemplated that elements may be stored remotely, delivered to a client system on demand by a server computer, and executed partially or completely by the server and client. Accordingly, the present invention is not limited by the method of distribution or packaging that a particular application involves. In other words, the present invention may be distributed client-only software devices, server-only software devices, or as system software that is distributed to both client and server devices.

Figure 2:
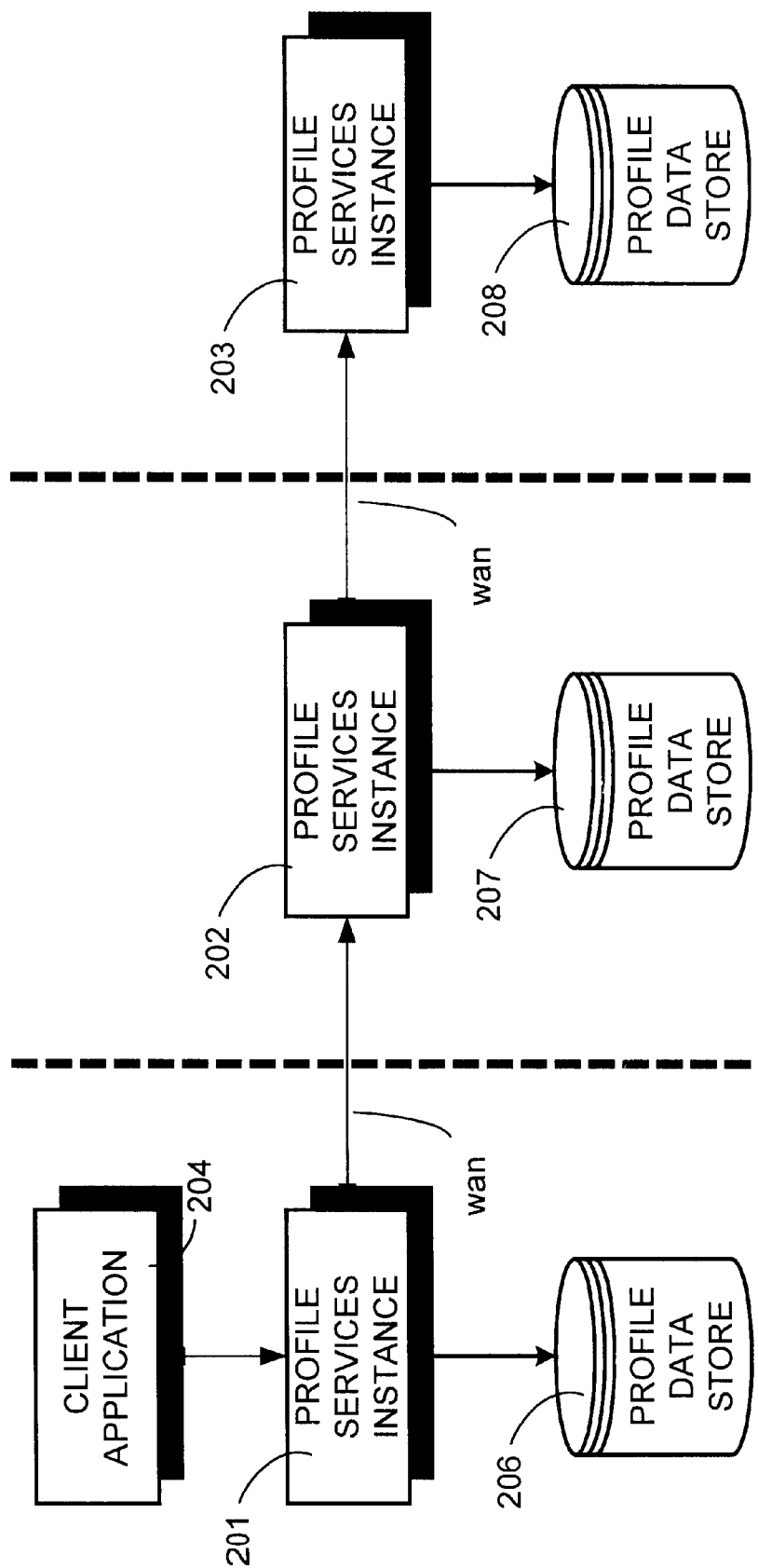
FIG. 2 shows a more specific network architecture in which in which the present invention is employed in a simple form.

FIG. 2 shows a generalized diagram of a distributed computing environment implementing the profile services in accordance with the present invention. The environment of FIG. 2 includes three profile services instances 201, 202 and 203. Each profile service instance is implemented in a separate local environment (e.g., a LAN or standalone environment) as suggested by the dashed vertical lines in FIG. 2. The local environments are coupled by an available WAN connection. A client application 204 accesses the profile service instance 201 to request profile services. The profile service instance 201, performs the requested service using the profile data store 205. Each profile service instance 201, 202, and 203 is associated with a data store 206, 207, and 208 respectively. The data store is local to the associated profile service instance meaning that the data store is directly accessible by the profile service without reliance on the WAN connection.

The profile service data structure is replicated across datastores 206, 207 and 208. That is to say, when profile or attribute information is added or updated in one datastore, that add or update is preferably replicated across each other datastore. Replication increases availability and accessibility. It is not required that all profile data be replicated as the frequency and methodology for replication can be selected by a system administrator to meet the needs of a particular environment. However, at least some profile data is replicated in the examples.

Figure 3:
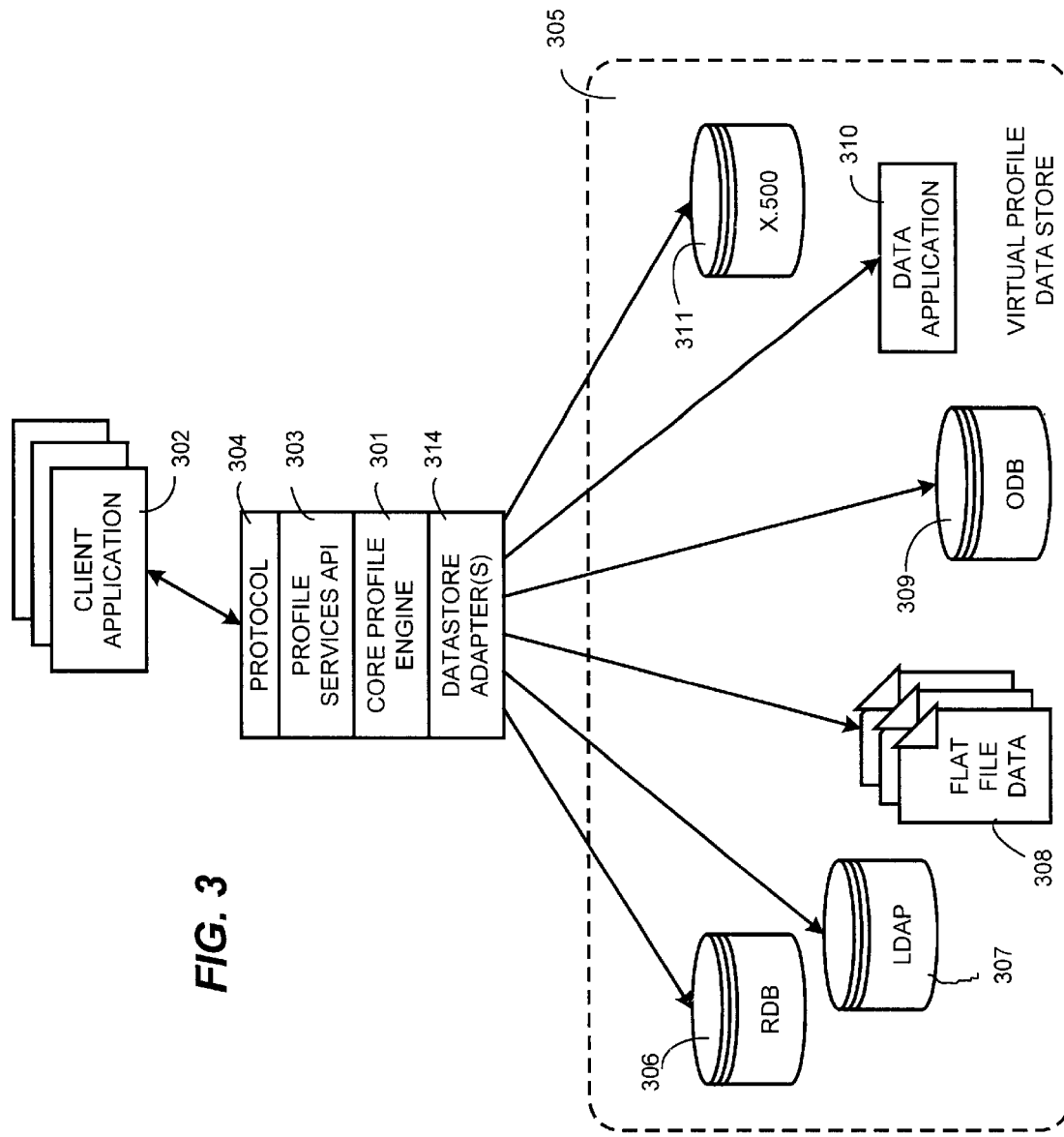
FIG. 3 shows in block diagram form significant components in a particular example of a profile service mechanism in accordance with the present invention.

FIG. 3 shows a more specific example of the present invention implemented in a gateway or firewall server such as gateway 104 or gateway 105 in FIG. 1. The components implemented in a gateway machine include a core profile engine 301 that is accessed by a client application 302 through a profile services application programming interface (API) 303. API 303 provides a protocol layer or mechanism 304 that implements an interface that enables client applications 302 that have a corresponding interface to send and receive messages. The messages enable the application to send data and commands to request profile services from core profile engine 301.

In a particular implementation the profile services protocol layer 304 implements a protocol based on extensible markup language (XML) documents embedded within hypertext transport protocol (HTTP) data packets. The XML documents have embedded elements that contain formatted versions of request and response messages communicated between client application(s) 302 and core profile engine 301. XML documents are a useful format because they provide a standard grammar that is well understood. Moreover, the XML language is extensible, actively developed, and readily transportable through a variety of communications media using commonly available HTTP transport mechanisms. Routers, switches, network ports, and other network devices handle packets containing embedded XML formatted documents and are configured to handle them appropriately and reliably.

It is contemplated that other formats and transport mechanisms may be used such as HTML forms, CORBA objects and the like. Also, other transport mechanisms may be useful in particular applications such as transport mechanisms specified for fibre channel fabrics as well as proprietary transport protocols. The markup language document is used to encode commands and control information in a declarative fashion in a readily transportable fashion. Accordingly, any available encoding format that is readily transportable using the available transport mechanism (e.g., HTTP) is suitable. These and other implementations are considered equivalent to the specific embodiments disclosed herein unless specifically indicated otherwise.

Core profile engine 301 responds to the client request messages by passing the message to an appropriate method in executing requested functions on virtual profile data store 305. In a particular implementation, core profile engine 301 maintains a set of meta-data about every attribute and binding for every profile. This meta-data controls how the profile engine 301 makes the profile data available to client applications 302. This meta-data includes, but is not limited to, information regarding owner identity, read-write-modify permissions, group membership, timestamps, triggers, and the like.

Virtual profile data store 305 may comprise a single data storage device, but more often comprises a plurality of disparate, heterogeneous data storage devices. The specific example of FIG. 1 includes a relational database 306, lightweight directory access protocol 307, flat data file 308, object oriented database 309, and X.500 directory 311. An adapter 314 may also access another data application 310 where the data application 301 provides an API compatible with the adapter 314 and operates to access other local and distributed data stores. In a particular implementation, adapter(s) 314 comprise an adapter for each data store device and/or protocol. Each adapter 314 includes an interface to core profile engine 301 and a special purpose interface configured to the specific data store within virtual data store 305 that it is intended to access. Virtual data store 305 includes a dynamically changing number of data store devices as devices can be added, changed, and deleted by modifications to the associated adapter 314.

The profile service in accordance with the present invention provides a high-speed mechanism to lookup, structure and store key/value pairs. These key/value pairs represent information about "entities" such as application software, users, hardware devices, and the like. The present invention is preferably implemented as a service running on a gateway server. The present invention is intended to integrate several physical data stores into a single, distributed logical data store of reference information.

Figure 4:
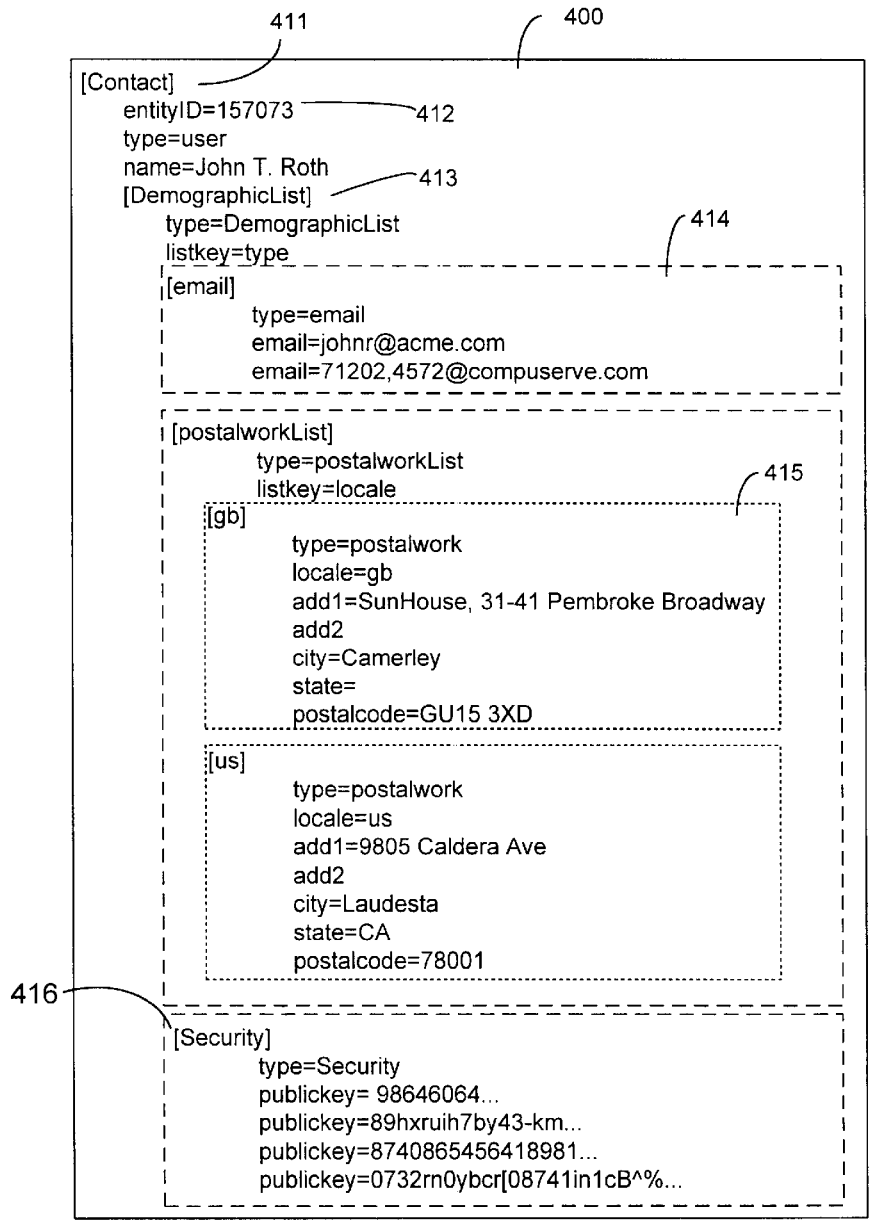
FIG. 4A and FIG. 4B show exemplary data structures for holding profile objects in accordance with the present invention.

As used herein, a "profile" is a data object containing a set of key/value pairs, such as profile 400 shown in FIG. 4. Each key/value pair is referred to as an "attribute" such as attribute 412 in FIG. 4. The value associated with a given key may be either a primitive value (e.g., a numeric value, string value, logical value, and the like) or may be another profile. When the value is another profile the value is referred to as a "subprofile" or binding. An individual profile in data structure 400 comprises 0 to n attributes and 0 to n subprofile bindings where "n" is an arbitrary value selected to meet the needs of a particular application. In the example of FIG. 4, profile names are enclosed by brackets [ ] and attributes 401 are represented as key=value pairs.

All profiles contain a type attribute. When the value of an attribute is a subprofile, the key is the type of the subprofile. In the case when the value is a subprofile the key/value pair is called a "binding". By binding several profiles it is possible to build hierarchical trees of information. It is possible to bind a profile to multiple parent profiles which is referred to herein as "linking". Linking enables the representation of relational information by creating a DAG (Directed Acyclical Graph) in addition to hierarchical information.

Profiles are not ordinarily restricted by the number of attributes that may be stored in a single profile. Moreover, individual attributes may have multiple values set as illustrated by the publickey attribute in FIG. 4. However, each binding has only a single value, although each profile may contain any number of bindings. As described hereinafter, a user may define a schema that forces profiles of specified types to contain at least a minimum set of attributes upon creation. A schema aids in providing uniformity and a minimal level of compatibility without limiting the dynamic and extensible nature of the profiles in accordance with the present invention.

Optionally, a schema may be associated with a profile data structure 400. A user may define a schema that forces profiles of specified types to contain at least a minimum set of attributes upon creation. A schema aids in providing uniformity and a minimal level of compatibility without limiting the dynamic and extensible nature of the profiles in accordance with the present invention. In the specific examples, conformance with a defined schema is only enforced when a profile is created. Hence, subsequent profile modifications may bring a profile out of compliance with the schema. In other words, the concept of a schema is loosely imposed on the profiles in the specific embodiment in favor of giving the user a greater freedom to manipulate, modify, and extend a schema after it is created.

As used herein, the term "object" refers to a data structure stored in mass storage or memory accessible by a computer that contains specified data and a set of methods or operations that enable the object to perform operations on the data it contains. The methods contained in an object also implement an interface enabling the object to receive data from and send data to other computer program devices. Data structure 400 is a representation of a profile object. It should be understood that the physical implementation of data structure 400 may vary significantly from application-to-application and may be implemented as a contiguous segment of storage locations or a dispersed arrangement of physical locations that are logically ordered in a manner shown in FIG. 4.

In general, when a profile is created it must be the "child" of some other profile, or it must be an "entity profile". In FIG. 4, profile 411 labeled "Contact" is an example of entity profile. An entity profile is a special subclass of a profile object that has an additional fixed attribute 412 called an entityID. The profile service in accordance with the present invention provides facilities for generating the entityID in a manner such that all entity profiles of the same type have unique entityIDs. Essentially, entity profiles serve a special role of establishing roots from which other profiles may be attached. Entity profiles support all of the operations of a profile, but add in addition support for some specialized method for accessing the ID attribute.

Entity profiles are used to represent data that has no single child relationship to another profile, or when no other profile exists. Entity profiles are useful to represent users, contacts, resources, components, groups, and the like. All of these entities have a discreet and meaningful independent existence and role in the real world. In contrast, conventional profiles (i.e., nonentity profiles) must always be attached as a child to either an entity profile or another nonentity profile. Nonentity profiles are useful for representing data such as display preferences, demographic information, identification information, and the like. All of these groups of information are meaningless unless related to some stand alone concept such as a user, resource, component, and the like.

In FIG. 4 the entity profilej 411 labeled "Contact" includes a number of attributes including a subprofile binding 413 labeled "DemographicList". The profile Demo-graphicList itself contains subprofile bindings to its list members 414, 415 and 416 "email", "postalworkList", and "Security" respectively.

DemographicList and PostalworkList in FIG. 4 are examples of another special profile type called a "profilelist". A profilelist relates multiple profiles of the same type to a single parent. This is done by binding a single profile list (e.g., postalworklist) to the parent (e.g., Contact) with multiple member profiles (e.g., "gb" and "us" in FIG. 4) are added to the list. While ProfileLists serve to collect profiles of the same type, it is contemplated that they may also be used as a convenient collection object for subprofiles of different types. It is important to note that profilelist themselves may not contain any attributes (other than system-set attributes indicating meta-data) and may not support the concept of a schema. As a result of this limitation, several profile operations may not be supported by ProfileLists.

FIG. 5A and FIG. 5B show simplified class diagrams indicating basic functional objects and characteristics of a profile service in accordance with the present invention. The profile service supports two basic functional objects, profiles themselves and a "profile manager". The profile manager interface is alternatively referred to as the profile service interface. The logical interfaces shown in FIG. 5A and FIG. 5B are not intended to be literal. Instead they are intended to articulate the fundamental functional operations that the service supports. All implementations of the profile service desirably support these classes of functions. In addition, individual implementations may support additional methods that are not supported in all implementations to meet the needs of a particular applications.

Profile Functions:

Tables 1–5 list functions implemented in profile objects. All of the listed functions require the specification of a profile upon which the function will operate. The profile can be specified, for example, by passing context information from the requesting entity to the profile service in the request message.

Table 1 lists a name and functional summary of exemplary methods defined in a profile class shown in FIG. 5A and available in instances of profile objects. In general, this category of methods manipulate attributes within a specified profile. Hence, once a profile object is created it is autonomous in the sense that it can be directly accessed or refered to by user calls and it no longer relies on the profile manager (discussed in reference to FIG. 5B) to enable attribute manipulation.

TABLE 1

Attribute Manager Methods

| Name | Functional summary |
|---|---|
| getAttrib | Given an attribute key will return the value(s) of the attribute. |
| setAttrib | Given a attribute key and attribute value, setAttrib will set one or more attributes on the profile where key = value. |
| listAttribs | Returns a list of all of the attribute keys for all attributes set on the profile exclusive of bindings. |
| removeAttrib | Removes all values of an attribute of the specified key value. |

Table 2 shows meta-data manipulation methods included in a profile object. In the exemplary implementation profile objects include meta-data associated with each attribute indicating such information as read/write/execute permissions, ownership, and the like. Metadata is used by the profile service to for managerial purposes, but is not considered an explicit part of a profile as it is not normally provided in response to attribute access requests. Nevertheless, each profile includes methods such as those in Table 2 retrieval and modification of attribute values.

TABLE 2

Meta-data Manager Methods

| Name | Functional summary |
| --- | --- |
| getProfileType | Return the value of the profiles type attribute. |
| getResourceID | Returns a resource ID for the profile that is guaranteed to uniquely identify this profile from all other profiles contained in any profile service instances bonded by the virtual datastore. |
| getMetaData | Returns the meta-data associated with a specified attribute or binding. |
| setMetaData | Sets one or more meta-data attributes associated with an attribute or binding. |
| chgrp | Changes the group owner of a specified attribute or binding. |
| chmod | Changes the permissions of a specified attribute or binding. |
| chown | Changes the owner of a specified attribute or binding. |

Table 3 lists schema methods. A profile schema is created to enforce specified properties on all profile instances of a particular type. For example, consider a profile of type=employee. If no schema is defined, for each instance of the type=employee an independent profile is created in such a way that each profile can have a different set of attributes, subprofile bindings, and external data references. In contrast, when a schema is defined for a specified profile type, the schema specified a minimum set of attributes that must be included in all new profiles of that type. and enforced upon creation.

TABLE 3

Schema Manager Methods

| Name | Functional summary |
| --- | --- |
| ConformsToSchema | Returns true if this profile instance contains all required attributes a schema defined for this profile type. |
| GetSchema | Returns the schema defined for profiles of this type |
| hasschema | Returns true if a schema has been defined for profiles of this type |

Table 4 summarizes subprofile binding methods used to bind profiles to other profiles. Functions offered by the subprofile binding methods include method to list and retrieve existing bindings within a profile, as well as to create new bindings, revise existing bindings, and destroy existing bindings.

TABLE 4

Subprofile Binding Methods

| Name | Functional summary |
| --- | --- |
| listBindings | Returns a list of all bindings that this profile contains as a list of binding keys |

TABLE 4-continued

Subprofile Binding Methods

| Name | Functional summary |
| --- | --- |
| lookup | Returns a subprofile of this profile bound to the specified key |
| bind | Established a parent child relationship between this profile and a specified profile (the child). Essentially, an attribute is established whose value is a subprofile. |
| rebind | Established or redefines a parent child relationship between this profile and a specified profile (the child). Essentially an attribute is established whose value is a subprofile. |
| unbind | Removes a binding from this profile |

In addition to the methods listed in tables 1–4, profile objects also include search, template, and control methods as indicated in FIG. 5A. A search method accepts a user entity specified search expression, returns a list of subprofiles, or possibly attributes of a specified profile, that match the specified search expression. Template methods control the manner in which a given profile refreshes itself against a specified template to which it is attached. By default new values in an attached profile will not be modified by a refresh unless a "force flag" is set. By attaching a profile to a template and setting the force flag, changes in the template are reflected in the attached profile whenever the profile's refresh method is activated. Refresh can be performed on demand by the user entity, or automatically as specified in the template methods. Control methods include, for example, methods that define whether the profile can be extended by a user. As noted hereinbefore, a powerful feature of the present invention is that profiles can be dynamically extended by users. However, the present invention also provides a means by which this feature can be turned off.

The entity profile class includes variables, data and methods necessary to define basic functional interfaces of entity profiles described hereinbefore. In the specific example of FIG. 5A the entity profile class extends the profile interface (i.e., it supports all the methods found in the profile interface) by providing several method that are specific to entity profiles. Table 5 summarizes these special methods.

TABLE 5

| Method | Operation Summary |
| --- | --- |
| getEntityID | Returns the entity ID of a specified entity profile. |
| getEntityName | Returns the value of the name attribute of a specified entity profile. |
| getEntityType | Returns the value of the type attribute of a specified entity profile. |

The profile list class includes variables, data and methods necessary to define basic functional interfaces of profile lists described hereinbefore. The profile list class also extends the profile interface and provides additional methods used to look at and manipulate the contents of a profile list. Table 6 summarizes operation of the components of a Profile list object shown in FIG. 5A.

TABLE 6

| Method | Operation Summary |
| --- | --- |
| add | Adds a specified profile to the list membership. |
| remove | Removes a profile associated with a specified key from the list membership. |
| next | Moves the list index to the next member profile in the list. |
| previous | Moves the list index to the previous member profile in the list. |

Profile Manager Functions:

The profile manager provides mechanisms called "factory methods" for creating and retrieving profiles as well as establishing schemas for profiles. Table 7 summarizes significant methods in the profile manager functions. Essentially, the methods summarized in Table 7 include factory methods that create new profiles (including entity profiles and profile lists), retrieve profiles, search profiles, define profile schema, and implement external data store methods. Search methods are substantially similar to the search methods used in profile objects, however, search all attributes within a specified profile rather than all attributes hierarchically below a specified profile.

TABLE 7

| Name | Functional summary |
| --- | --- |
| newprofile | Given a set of initializing criteria creates a new profile. |
| newEntity | Given a set of initializing criteria creates a new entity profile. |
| removeProfile | Given a specified profile removes the profile. |
| retrieveprofile | Given a descriptor of a specific profile returns reference to the profile. |
| search | Given a search expression returns a list of zero or more profiles, or possibly attributes of, that match the specified search expression. |
| defineprofileschema | Given a set of required attributes and a profile type establishes a schema for all profiles of the specified type. |
| redefineprofileschema | Given a set of required attributes and a profile type establishes redefines a schema for all profiles of the specified type. |
| removeProfileSchema | Given a specified type removes any schema that may have been defined for it. |

In addition to the functions shown in Table 7, the profile manager desirably includes functions to define references to external datastore mechanisms as described in reference to FIG. 3.

To understand the power of these methods it is important to note that a user entity may be a human user, another software application, hardware device, or the like. The functions described in Tables 1–7 are representative only and it is contemplated that the profile, entity profile, profile list, and profile manager classes will implement a variety of other methods to meet the needs of a particular application. The specific methods and interfaces identified herein can be implemented in any available object-oriented programming environment such as, for example, SmallTalk, C++, Java, and the like.

Optionally, profile service engine 301 includes an interface for communicating with other services. Examples of such services include an authorization service that supports enterprise level access control enforcement by authorizing and authenticating user entities. Another example is a group service that provides a mechanism for defining and maintaining group entity profiles, for example. This enables the profile service in accordance with the present invention to dynamically integrate functionality as new services and software applications become available that can communicate with the provided optional interface.

FIG. 6 shows an exemplary mechanism for accessing the profile service interface in accordance with the present invention. In FIG. 6, the user entity is a client software application 601. The interface in accordance with the present invention is useful in a distributed, heterogeneous computing environment where the machine upon which profile service program 301 is running may be separate from client application 601. Moreover, profile service 301 may be running on a server using a first operating system such as Solaris™, Linux, WindowsNT, or the like. Client application 601 may be running on a personal computer, laptop computer or palm computer or the like executing another operating system such as Windows 98, Windows CE, or a Java™ runtime environment, for example. Java and Solaris are trademarks or registered trademarks of Sun Microsystems, Inc. in the United States and other countries.

The implementation shown in FIG. 6 leverages the large installed base of hypertext transfer protocol (HTTP) transport layer devices that are ported to a wide variety of hardware and software applications. Client application 601 should include or have access to an HTTP transport protocol mechanism. The HTTP transport mechanism is widely used on the Internet for transporting hypertext documents such as hypertext markup language (HTML) and extensible markup language (XML) documents. Existing switches and routers in the physical communication network handle HTML and XML documents, among other formats, encoded into an HTTP data packet. In this manner, the present invention requires little or no change in the user entities' configuration and physical transport network configuration.

While the illustrated examples use XML embedded in HTTP, it should be understood that more generally any available transport protocol may be used. Moreover, any available mechanism for embedding declarative program calls and statements may be readily substituted for the XML implementations of the specific example, including SGML, HTML, or other equivalent languages and protocols for representing a declarative statement suitable for embedding in the selected transport.

In accordance with the present invention, a user entity such as client application 601 generates one or more request messages that access services provided by core profile engine 301. The request messages have a one-to-one correspondence with the profile manager methods and profile methods described hereinbefore. That is to say, for each method there is a corresponding request message used to access that method. The request message also includes argument data required by the method such as context information identifying the requesting user entity, providing authentication information, and the like.

The request message(s) is(are) encapsulated in an XML document called a RequestSet 701 shown in FIG. 7. A request set is defined by an XML data type description (DTD). The RequestSet DTD comprises a plurality of nested elements where at least one of the elements corresponds to a method in the profile manager or a profile itself. The element can include arguments required by the corresponding method. In accordance with the present invention, each element that corresponds to a request message includes a unique identification, indicated as "reqid" 702 in FIG. 7. Optionally, an element includes a request version identifier indicated as "reqvers" 703 and its format in RequestSet 701. The reqid and reqvers information uniquely identifies a given request message among many request messages that may be pending or "in-flight" at any given time. The reqid and reqvers can be assigned by the client application 601.

It is contemplated that as core profile service 301 evolves, the methods implemented therein will evolve with new versions of methods implemented to improve performance or offer additional functionality. Accordingly, the request message can specify a specific version of a method that is to be used. By default, for example, the most current version can be used. However, a user entity can specify an older version using the "methid" and "methvers" variables 706 and 707 shown in FIG. 7. The "intfid" variable 704 in RequestSet 701 serves to identify which functional API is to be used (e.g., the profile manager API or a profile API).

As shown in FIG. 6, protocol adapter 304 implements the HTTP transport protocol to extract the RequestSet from the HTTP data packet and reformat the RequestSet document as a plurality of request messages. Profile services API 303 accepts the request messages and passes the messages to appropriate profile objects or the profile manager object for execution within core profile service engine 301. Typically a response message will be generated for each request message. Profile service API 303 receives the response message(s) and formats them into mark-up language documents such as an XML ResponseSet document 801 shown in FIG. 8. Like the RequestSet 701, ResponseSet 801 is defined by a data type definition called a ResponseSet. Each ResponseSet includes a plurality of nested elements at least some of which correspond to formatted response messages.

Desirably, each response message is tagged or marked with a response identification indicated using the "resid" variable 802 that uniquely identifies the response message among many response messages that may be pending at any given time. Request identification information labeled "reqid" 803 and "reqvers" 804 in FIG. 8 indicate the request message to which the particular response message is responsive. Each response message can include a returned value or other data that is the result of operations performed in core profile engine 301.

In this manner, responses can be matched up with the corresponding request by matching reqid tags. Multiple requests can be pending at any given time to encourage efficient operation in a distributed environment. Because the XML documents may comprise an arbitrarily large number of elements (i.e., formatted request messages) each RequestSet and each ResponseSet preferably include a plurality of formatted request/response messages at one time. This enables efficient use of network resources in a distributed network.

It will be appreciated that the profile service described herein provides generic profiling capability accessible over conventional network facilities and readily integrated with a wide variety of software application in a manner that defines the fundamental behavior, representation, and functional interfaces for profile objects. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A mechanism for managing a plurality of profile data structures, each profile data structure comprising a hierarchical structure of attributes, where each attribute comprises information about an entity, the mechanism comprising:

a plurality of profile objects having an interface for sending and receiving information;

a profile service mechanism having an interface for sending and receiving information;

a protocol layer operatively coupled to the profile objects interface and the profile service interface, the protocol layer defining a plurality of request elements and a plurality of response elements;

protocol layer interface within the protocol layer receiving user-entity specified set of request elements from the user entity and sending a responsive set of response elements to the user entity;

a first set of methods within the profile service mechanism that create instances of the profile objects, wherein each of the first set of methods correspond to one of the request elements and one of the response elements; and a second set of methods within the profile objects that manipulate instances of the profile objects, wherein each of the second set of methods correspond to one of the request elements and one of the response elements.

2. The mechanism of claim 1 wherein the protocol layer defines a mark-up language document in which a set of request elements selected by the user entity are embedded.

3. The mechanism of claim 1 wherein the protocol layer defines a mark-up language document in which a set of response elements selected by the user entity are embedded.

4. The mechanism of claim 2 wherein the markup language document comprises an XML document.

5. The mechanism of claim 1 wherein the protocol layer interface comprises a hypertext transfer protocol (HTTP).

6. The mechanism of claim 1 wherein each request element has a unique ID and each response element is given an ID corresponding to the request ID to which it is responsive.

7. The mechanism of claim 1 wherein the first set of methods comprise factory methods, profile retrieval methods, profile search methods, schema methods, and external data store methods.

8. The mechanism of claim 1 wherein the second set of methods comprise attribute manager methods, meta-data manager methods, subprofile binding methods, profile search methods, schema methods, template methods, and control methods.

9. The mechanism of claim 1 further comprising a plurality of entity profile objects that are extensions of the profile objects, the entity profile objects including a distinct set of entity methods with respect to the profile objects, wherein each of the entity methods correspond to one of the request elements and one of the response elements.

10. The mechanism of claim 1 further comprising a plurality of profile list objects that are extensions of the profile objects, the profile list objects including a distinct set of profile list methods with respect to the profile objects, wherein each of the profile list methods correspond to one of the request elements and one of the response elements.

11. A program interface for integration with a service software program having a plurality of defined methods, each method configured to receive one or more arguments, the interface comprising:

a client software program generating a set of service request messages to be satisfied by the service software program, each request message specifying one of the plurality of methods and including any necessary arguments for the specified method;

a client-side protocol mechanism formatting the service request messages into a mark-up language request document;

a client-side transport protocol layer embedding the mark-up language request document into a transportable data packet;

a server-side transport protocol layer receiving the transportable data packet and extracting the mark-up language request document from the transportable data packet; and a service-side protocol layer coupled to receive the mark-up language document, extract a set of request messages and pass each request messages to the service software program specified in the request message.

12. The interface of claim 11 wherein the service-side protocol layer is further coupled to receive response messages generated by the service software application and format the response messages into a markup language response document for transport to the client software program.

13. The interface of claim 11 wherein the transport protocol layers comprise hypertext transport protocol (HTTP) devices.

14. The interface of claim 13 wherein the transportable data packet comprises an HTTP post packet.

15. The interface of claim 13 wherein the transportable data packet comprises an HTTP get packet.

16. The interface of claim 11 wherein the client-side protocol mechanism comprises an extensible markup language mechanism.

17. The interface of claim 16 wherein the markup language document comprises an extensible markup language (XML) document having a data type definition (DTD) including a number of request elements, each request element indicating a specified method and an argument required by the specified method.

18. The interface of claim 12 wherein:

each markup language request document comprises a plurality of request elements, each request element having a unique ID associated therewith; and the markup language response document comprises a plurality of response elements each response element having a tag indicating the unique ID of a request element to which it is responsive.

19. A method for accessing a profile server, the profile server managing a plurality of profile objects, each of the profile objects including a first set of methods for manipulating attributes contained in the profile object, the method comprising the steps of:

creating an instance of a profile service mechanism having a second set of methods defining a first interface for communicating with a user entity and a second interface for communicating the plurality of profile objects;

using an external software application, generating a request message identifying one of the methods in the first and second set of methods;

formatting the request message as an extensible markup language (XML) request document;

embedding the XML document in an HTTP transport packet;

communicating the HTTP transport packet to the profile service mechanism;

extracting the embedded, formatted request message from the XML document; and directing the extracted request message to the method identified in the request message.

20. The method of claim 19 further comprising the step of including argument data with the request message.

21. The method of claim 19 further comprising the steps of:

using the identified method, generating a response message in response to the request message;

formatting the response message as an XML response document;

embedding the XML response document as an HTTP transport packet; and communicating the HTTP transport packet to the external software application.

22. The method of claim 21 wherein the request document uniquely identifies each formatted request message and the response document includes a tag indicating the formatted request message to which it is responsive.

23. A computer program product embodied in a tangible form comprising:

computer program devices readable by a data processor coupled to receive the propagating signal for interfacing with a profile data service, the computer program product comprising:

first program code devices configured to cause a data processor to create an creating an instance of a profile service mechanism having a second set of methods defining a first interface for communicating with a user entity and a second interface for communicating the plurality of profile objects;

second program code devices configured to cause a data processor to generating a request message identifying one of the methods in the first and second set of methods;

third program code devices configured to cause the data processor to format the request message as an extensible markup language (XML) request document;

fourth program code devices configured to cause the data processor to embed the XML document in an HTTP transport packet;

fifth program code devices configured to cause the data processor to communicate the HTTP transport packet to the profile service mechanism;

sixth program code devices configured to cause the data processor to extract the embedded, formatted request message from the XML document; and seventh program code devices configured to cause the data processor to direct the extracted request message to the method identified in the request message.

24. The computer program product of claim 23 wherein the tangible form comprises a magnetic disk.

25. The computer program product of claim 23 wherein the tangible form comprises an optical disk.

26. The computer program product of claim 23 wherein the tangible form comprises a propagating signal.

27. The computer program product of claim 23 wherein the tangible form comprises a random access memory device.

28. A mechanism for accessing a profile server comprising:

means within the profile server for managing a plurality of profile objects, each of the profile objects including a first set of methods for manipulating attributes contained in the profile object, the method comprising the steps of:

means for creating an instance of a profile service mechanism having a second set of methods defining a first interface for communicating with a user entity and a second interface for communicating the plurality of profile objects;

means for generating a request message identifying one of the methods in the first and second set of methods;

means for formatting the request message as an extensible markup language (XML) request document;

means for embedding the XML document in an HTTP transport packet;

means for communicating the HTTP transport packet to the profile service mechanism;

means for extracting the embedded, formatted request message from the XML document; and means for directing the extracted request message to the method identified in the request message.

* * * * *

UNITED STATES PATENT AND TRADEMARK OFFICE
CERTIFICATE OF CORRECTION

PATENT NO.    : 6,542,515 B1                                    Page 1 of 1
DATED         : April 1, 2003
INVENTOR(S)   : Paul William Weschler, Jr. and Ravi Kumer It is certified that error appears in the above-identified patent and that said Letters Patent is hereby corrected as shown below:

<u>Column 18,</u>
Line 28, delete "an creating"

Signed and Sealed this

Second Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,542,515 B1  Page 1 of 1
DATED         : April 1, 2003
INVENTOR(S)   : Paul William Weschler, Jr. and Ravi Kumar It is certified that error appears in the above-identified patent and that said Letters Patent is hereby corrected as shown below:

<u>Column 18,</u>
Line 28, delete "an creating"

This certificate supersedes Certificate of Correction issued September 2, 2003

Signed and Sealed this

Eighteenth Day of November, 2003

JAMES E. ROGAN
*Director of the United States Patent and Trademark Office*